US012757231B2

(12) United States Patent
Dubray et al.

(10) Patent No.: US 12,757,231 B2
(45) Date of Patent: Oct. 6, 2026

(54) METHOD FOR INITIATING A COMMUNICATION LINK BETWEEN A FIELD DEVICE AND A CONTROL UNIT

(71) Applicant: KROHNE S.A.S., Romans-sur-isère Cedex (FR)

(72) Inventors: Olivier Dubray, Chatuzange-le-Goubet (FR); Denis Lambert, Saint Bardoux (FR); Florian Chanal, Saint Barthelemy de Vals (FR); Fabrice Marcel, Saint Péray (FR)

(73) Assignee: Krohne S.A.S., Romans-sur-Isère Cedex (FR)

( * ) Notice: Subject to any disclaimer, the term of this patent is extended or adjusted under 35 U.S.C. 154(b) by 337 days.

(21) Appl. No.: 18/411,375

(22) Filed: Jan. 12, 2024

(65) Prior Publication Data

US 2024/0244645 A1 Jul. 18, 2024

(30) Foreign Application Priority Data

Jan. 12, 2023 (DE) ..................... 10 2023 100 650.9

(51) Int. Cl.
*H04W 72/30* (2023.01)
*H04L 67/12* (2022.01)
*H04W 48/10* (2009.01)

(52) U.S. Cl.
CPC ............. *H04W 72/30* (2023.01); *H04L 67/12* (2013.01); *H04W 48/10* (2013.01)

(58) Field of Classification Search
CPC .......... G05B 2219/25428; G01D 21/00; H04L 12/12; H04L 67/12; H04W 4/38; H04W 4/80; H04W 12/009; H04W 12/068; H04W 48/10; H04W 72/30; H04W 76/10; H04W 80/00
See application file for complete search history.

(56) References Cited

U.S. PATENT DOCUMENTS

| | | | | |
|---|---|---|---|---|
| 7,804,804 | B2 * | 9/2010 | Sugaya | H04W 48/18 370/347 |
| 10,140,865 | B2 * | 11/2018 | Hu | H04W 4/021 |
| 10,194,374 | B2 * | 1/2019 | Kim | H04W 72/0446 |
| 11,333,567 | B2 * | 5/2022 | Dormody | G01C 5/06 |

(Continued)

FOREIGN PATENT DOCUMENTS

| | | | | |
|---|---|---|---|---|
| CN | 111225349 A | * 6/2020 | | H04M 1/72412 |
| CN | 116250262 A | * 6/2023 | | H04W 48/16 |

(Continued)

*Primary Examiner* — Eric Nowlin
(74) *Attorney, Agent, or Firm* — Muncy, Geissler, Olds & Lowe, P.C.

(57) ABSTRACT

A method for initializing a communication link between a field device and a control unit according to a communication protocol is described. The communication protocol defines a broadcasting message with a data area. From the field device, a broadcasting message is generated and transmitted according to the communication protocol with a first datum in the data area. The first datum determines whether a communication connection is possible or not. The broadcasting message is received by the control unit and then, when the first datum determines the possibility of the communication connection, the communication connection is initialized by the control unit.

20 Claims, 2 Drawing Sheets

(56) References Cited

U.S. PATENT DOCUMENTS

| | | | | |
|---|---|---|---|---|
| 11,412,348 | B2 * | 8/2022 | Ferreira | H04W 4/027 |
| 11,579,036 | B2 * | 2/2023 | Dormody | G01C 5/06 |
| 11,769,402 | B2 * | 9/2023 | Zhu | G06V 20/58<br>701/26 |
| 11,902,960 | B2 * | 2/2024 | Huang | H04W 72/02 |
| 11,943,682 | B2 * | 3/2024 | Narayan | H04W 4/029 |
| 12,381,594 | B2 * | 8/2025 | Woodburn | H04B 1/38 |
| 2006/0268800 | A1 * | 11/2006 | Sugaya | H04W 48/18<br>370/338 |
| 2010/0226309 | A1 * | 9/2010 | Kasslin | H04W 48/12<br>370/328 |
| 2014/0161107 | A1 * | 6/2014 | Kasslin | H04W 40/244<br>370/336 |
| 2016/0128112 | A1 * | 5/2016 | Dunsbergen | H04W 4/80<br>455/41.2 |
| 2016/0301238 | A1 * | 10/2016 | Khoshvenis | H02J 50/80 |
| 2017/0055108 | A1 * | 2/2017 | Jeon | H04W 4/40 |
| 2017/0257814 | A1 * | 9/2017 | Kim | H04W 40/244 |
| 2018/0084484 | A1 * | 3/2018 | Hariharan | H04W 48/12 |
| 2018/0084485 | A1 * | 3/2018 | Hariharan | H04W 8/005 |
| 2018/0150871 | A1 * | 5/2018 | Adoni | G06Q 30/0251 |
| 2018/0286237 | A1 * | 10/2018 | Hu | G08G 1/146 |
| 2019/0087807 | A1 * | 3/2019 | Choi | H04L 9/3226 |
| 2019/0125224 | A1 * | 5/2019 | Kamath | A61B 5/14532 |
| 2019/0132801 | A1 * | 5/2019 | Kamath | A61B 5/14532 |
| 2019/0148987 | A1 * | 5/2019 | Jung | H02J 50/60<br>307/104 |
| 2019/0173885 | A1 * | 6/2019 | Kamath | A61B 5/14532 |
| 2019/0270459 | A1 * | 9/2019 | Williams | H04M 1/72454 |
| 2019/0349890 | A1 | 11/2019 | Hoferer et al. | |
| 2019/0387473 | A1 * | 12/2019 | Lang | G07C 9/00309 |
| 2020/0027350 | A1 * | 1/2020 | Hu | G08G 1/147 |
| 2020/0036792 | A1 * | 1/2020 | Palin | H04W 4/80 |
| 2020/0120723 | A1 * | 4/2020 | Hariharan | H04W 76/10 |
| 2020/0170053 | A1 * | 5/2020 | Griesser | H04M 1/72412 |
| 2020/0196122 | A1 | 6/2020 | Junk et al. | |
| 2021/0078571 | A1 * | 3/2021 | Zhu | H04W 12/03 |
| 2021/0204088 | A1 * | 7/2021 | Ferreira | G01S 5/0284 |
| 2021/0315031 | A1 * | 10/2021 | Wu | A61N 1/3956 |
| 2021/0345085 | A1 * | 11/2021 | Anselm | H04W 8/005 |
| 2021/0373831 | A1 * | 12/2021 | Yu | G06F 3/1285 |
| 2021/0389204 | A1 * | 12/2021 | Dormody | G01L 27/002 |
| 2022/0104220 | A1 * | 3/2022 | Huang | H04W 8/005 |
| 2022/0159747 | A1 * | 5/2022 | Hariharan | H04W 8/005 |
| 2022/0182788 | A1 * | 6/2022 | Narayan | H04W 4/029 |
| 2022/0244126 | A1 * | 8/2022 | Dormody | G01C 5/06 |
| 2022/0263829 | A1 * | 8/2022 | Kamath | A61B 5/14532 |
| 2022/0394428 | A1 * | 12/2022 | Movva | H04W 4/029 |
| 2023/0039943 | A1 * | 2/2023 | Wu | H04W 84/18 |
| 2024/0072840 | A1 * | 2/2024 | Woodburn | H04W 4/80 |
| 2024/0098818 | A1 * | 3/2024 | Wu | A61N 1/37252 |

FOREIGN PATENT DOCUMENTS

| | | | | |
|---|---|---|---|---|
| DE | 102018129595 | A1 | 5/2020 | |
| WO | WO-2021242411 | A1 * | 12/2021 | G06F 3/1232 |
| WO | WO-2022067261 | A1 * | 3/2022 | H04W 72/02 |
| WO | WO-2024044009 | A1 * | 2/2024 | H04B 1/69 |

* cited by examiner

METHOD FOR INITIATING A COMMUNICATION LINK BETWEEN A FIELD DEVICE AND A CONTROL UNIT

TECHNICAL FIELD

The invention relates to a method for initializing a communication link between a field device and a control unit according to a communication protocol. Accordingly, the communication link is established after initialization of the communication link and communication between the field device and the control unit takes place according to the communication protocol. The communication protocol defines a broadcasting message with a data area. A broadcasting message generated according to the communication protocol therefore has a data area. At least one datum can be stored in the data area of a broadcasting message.

BACKGROUND

A field device is a device in the field of automation technology that is directly related to a production process. A field device has, for example, an actuator and/or a sensor. A field device is usually connected to a control system via a fieldbus.

Before communication can take place between the field device and the control unit according to the communication protocol, a communication link must first be initialized. After initialization, the communication link is established, via which communication then takes place according to the communication protocol. In practice, problems often occur during the initialization of the communication link.

SUMMARY

The object of the present invention is therefore to provide a method for initializing a communication link between the field device and the control unit according to the communication protocol, in which problems during initialization are at least mitigated. Mitigation also means that problems are less likely to occur.

The object is achieved by the disclosed method. The method according to the invention supplements the method described above in that a broadcasting message is generated and transmitted by the field device according to the communication protocol with a first datum in the data area, and the first datum determines whether or not a communication link is possible.

Furthermore, the broadcasting message is received by the control unit and, if the first datum determines the possibility of the communication link, the communication link is initialized by the control unit.

The first datum is therefore information that indicates whether the communication link with the field device is possible or not. The control unit evaluates the received broadcasting message and thus also the first datum. If the result of the evaluation is that the first datum determines the communication link, i.e. the communication link is possible, then the control unit initializes the communication link. Initialization is usually followed by the establishment of the communication link. If the first datum does not determine the possibility of the communication link and the control unit attempts to initialize the communication link anyway, the field device will refuse to do so.

Although the initialization of the communication link preferably only takes place if it is possible, this is not apparent to a user of the control unit. Therefore, in one design of the method, it is provided that the control unit displays the first datum for a user of the control unit. In particular, the datum is displayed in a format that is understandable for the user, i.e. a human. This allows the user to see whether initialization is possible or not.

In practice, it is often not possible to initialize the communication link immediately. To solve this problem, two alternative designs are presented below.

In the first alternative, the field device determines a duration until the communication link is possible as the first datum. The control unit then initializes the communication link after the duration has elapsed. Accordingly, the duration is the first datum in the data area of the broadcasting message. This duration is understood by the control unit in such a way that the communication link is only initialized by the control unit after this duration has expired. The duration preferably begins when the broadcasting message is received by the control unit.

In the second alternative, the first datum determines the possibility of the communication link. Furthermore, the field device generates a second datum in the data area of the broadcasting message. The second datum determines a duration until the communication link is possible. The control unit then initializes the communication link after the duration has expired. Thus, the data area of the broadcasting message has the first and second datum. Otherwise, the explanations for the first alternative apply.

In the first alternative, the first datum is interpreted by the control unit in such a way that the communication link is possible and that the initialization can be carried out after the duration has expired. The first datum therefore contains two pieces of information. In the second alternative, the first and second datums each have only one piece of information. The first datum contains the information that the communication link is possible and the second datum contains the information that the initialization of the communication link can be completed after the duration has expired.

These two alternatives can be further developed in various ways.

In a further development of the two alternatives, the field device reduces the duration by a waiting time and, after the waiting time, resends the broadcasting message with the reduced duration. The waiting time is a time between two successive transmissions of the broadcasting message. Preferably, the field device resends the broadcasting message several times and reduces the duration by the waiting time each time. In this way, the field device continuously signals the possibility of the communication link and the duration is not unnecessarily long.

In another further development, the control unit displays the duration to the user of the control unit. This informs the user when the initialization of the communication link will take place.

In a further design of the method, the control unit and the field device establish the communication link after the initialization of the communication link and communicate according to the communication protocol.

The case described in the previously described design usually occurs when the communication link is successfully established after initialization. However, it is also possible that the communication link is not successfully established. Therefore, in a further design of the method, if the method has the duration described above, it is provided that an unsuccessful attempt is made to establish the communication link and the field device then increases the duration by an amount. In a further development of this design, the duration is increased by the amount or by another amount for each unsuccessful attempt to establish the communication link in a time interval. The increase in time increases security and a user notices from the increasing duration that there is a problem with the establishment of the communication link.

The communication link can be either wireless or via a medium such as an electrical conductor. In one design of the method, it is provided that the field device and the control unit communicate with each other wirelessly via the communication link in accordance with the communication protocol. This eliminates the medium and the need to connect the field device and the control unit to the medium, which reduces the communication effort.

If the communication link is wireless, then preferably a Bluetooth standard is the communication protocol. The Bluetooth standard is therefore implemented as the communication protocol.

If the communication protocol is a Bluetooth standard, then preferably an advertising message is the broadcasting message. A Bluetooth standard that defines an advertising message is therefore used. According to the Bluetooth standard, advertising messages serve purposes other than the purpose described here in connection with the method.

In a further design, the first datum is stored in a bit of a byte in the data area. Such an advertising message also has a data area. This data area then contains the first and, if applicable, the second datum. Storing the first datum in just one bit is extremely economical in terms of the memory space available in an advertising message.

If the data area has a second datum, then preferably the second datum is also stored in at least one of the remaining bits of the byte. This means that up to 7 bits are available for storage of the duration. If the 7 bits in the byte are not sufficient for storing the duration, a further byte is also used in the data area.

It is known from practice that unauthorized authentication is attempted by the control unit on the field device, for example by an unauthorized user. In one design, the authentication is then rejected by the field device and the communication link between the control unit and the field device is disconnected. Disconnecting the connection improves the security of the field device against tampering.

Authentication is performed, for example, to extend rights on the field device or in connection with the communication link.

Preferably, authentication is performed using a PIN or a password or a fingerprint.

In a further design, the control unit is a smartphone. The functionality of the control unit is implemented on the smartphone using an application.

In a further design, the field device is a flowmeter, a level measuring device, a level switch, a temperature measuring device or a pressure measuring device. If the field device is a flowmeter, then it is preferably a magnetic-inductive flowmeter, a Coriolis mass flowmeter or an ultrasonic flowmeter. If the field device is a level measuring device, then it is preferably a radar level measuring device or an ultrasonic level measuring device. If the field device is a level switch, then it is preferably a vibrating level switch or a capacitive level switch.

BRIEF DESCRIPTION OF THE DRAWINGS

In detail, there are a number of possibilities for designing and further developing the method for communication between the field device and the control unit according to the communication protocol. Reference is made to the following description of a preferred embodiment in conjunction with the drawings.

DETAILED DESCRIPTION

Figure 1:
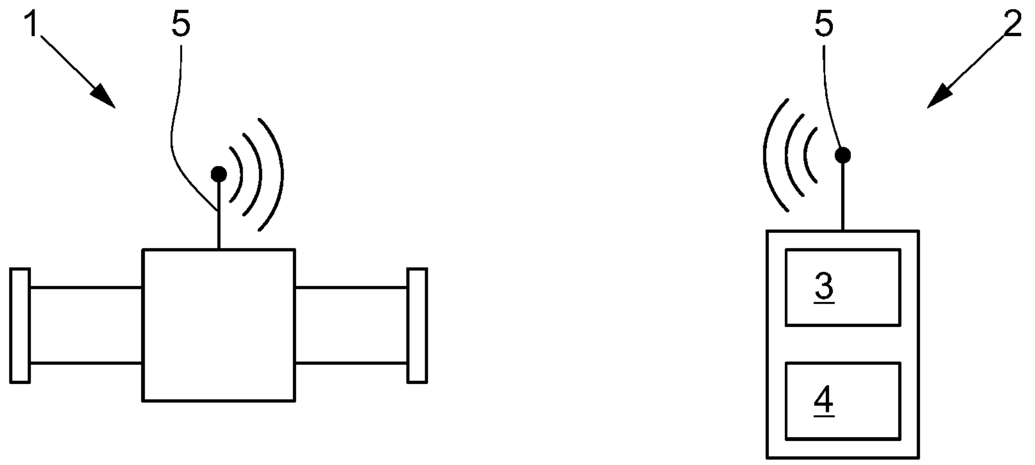
FIG. 1 illustrates an embodiment of a field device and a control unit.

FIG. 1 shows a field device 1 and a control unit 2, which are designed to communicate with each other according to a communication protocol. In this embodiment, the field device 1 is a magnetic-inductive flowmeter and the control unit 2 is a smartphone with a display 3 and a keyboard 4. The method described below is implemented in relation to the smartphone using an application. The field device 1 and the control unit are designed for wireless communication. In particular, they each have an antenna 5 for this purpose.

Figure 2:
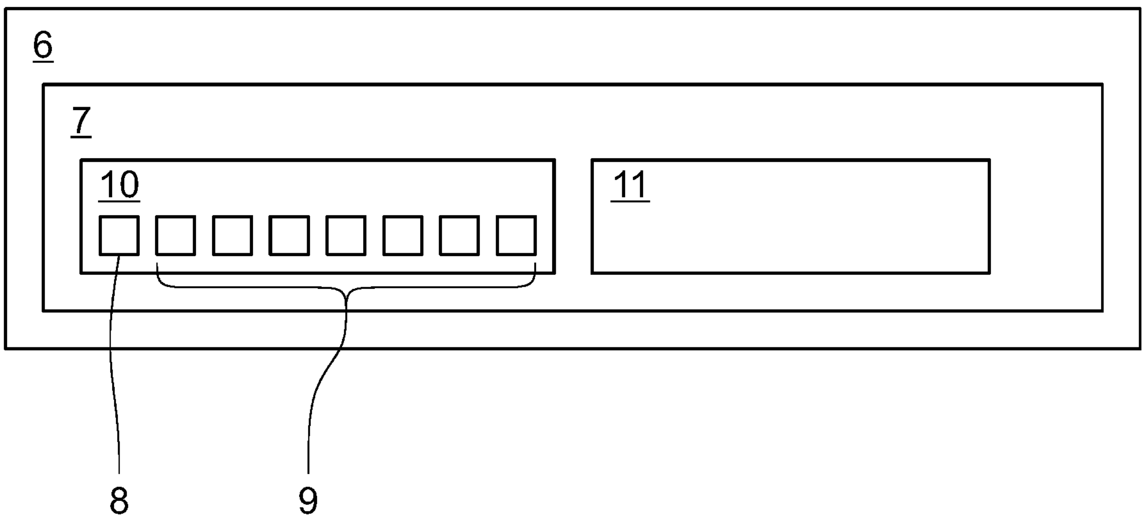
FIG. 2 illustrates an embodiment of a broadcasting message.
Figure 3:
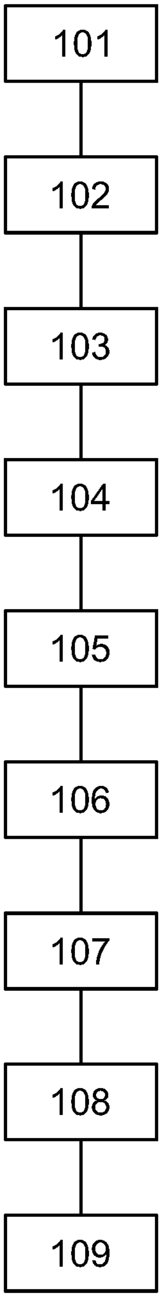
FIG. 3 illustrates an embodiment of a flowchart.

FIG. 2 shows a broadcasting message 6 with a data area 7, which is defined by the communication protocol.

In the following, the field device 1 and the control unit 2 are in operation and perform the following method.

In a first method step 101, a broadcasting message 6 is generated and transmitted by the field device 1 according to the communication protocol with a first datum 8 and a second datum 9 in the data area 7 of the broadcasting message 6. The first datum 8 determines whether a communication link between the field device 1 and the control unit 2 is possible or not. The second datum 9 determines a duration until the communication link is possible. Here, the communication link is possible and the duration is 10 s. In the present embodiment, the data area 7 has two bytes, i.e. a first byte 10 and a second byte 11 for storing information. The data area of a broadcasting message can also have more than two bytes. The first datum 8 and the second datum 9 are arranged by the field device 1 in the first byte 10 in the data area 7. Specifically, the first datum 8 is stored in the lowest value bit and the second datum is stored in the seven remaining bits of the first byte 10.

In a second method step 102, the control unit 2 receives and evaluates the broadcasting message 6. Then, if the evaluation determines that the first datum 8 determines the possibility of the communication link, the control unit 2 initializes the communication link after the duration has elapsed and the control unit 2 and the field device 1 establish the communication link and then communicate according to the communication protocol. In the present embodiment, the evaluation shows that the communication link is possible, namely after a duration of 10 s after receiving the broadcasting message 6. Before the duration expires, the initialization of the communication link is denied by the field device 1.

Accordingly, in a third method step 103 the communication link is initialized by the control unit 2, in a fourth method step 104 the communication link is established by the control unit 2 and the field device 1 and in a fifth method step 105 communication takes place via the established communication link according to the communication protocol.

The possibility of the communication link, i.e. the first datum, and the duration, i.e. the second datum, are also displayed by the control unit 2 on the display 3 in a way that is understandable for a user in the second method step 102.

The field device 1 and the control unit 2 communicate with each other wirelessly, i.e. in particular using the antennas 5, via the communication link according to the communication protocol. Any information is exchanged via the communication link. For example, in a sixth method step 106, a measurement of the field device 1 is started by the control unit 2 via the communication link, which is known to be a magnetic-inductive flowmeter in this embodiment. Furthermore, in a seventh method step 107, a measured value of the measurement is transmitted from the field device 1 to the control unit 2 via the communication link and displayed on the display 3 in a way that is understandable for the user.

In another example, in the sixth method step 106, a configuration of the field device 1 is changed or a status of the field device 1 is monitored by the control unit 2 via the communication link. The seventh method step 107 is omitted in this example.

The communication protocol is a Bluetooth standard, specifically one that defines an advertising message. In this embodiment, the advertising message is used as a broadcasting message.

In the further course of operation, in an eighth method step 108, the user attempts to authenticate the control unit 2 on the field device 1 by entering a password into the keypad 4 on the control unit 2. The authentication would result in the extension of the user's rights on the field device 2. However, since the password is not correct, the authentication is rejected by the field device 1 in a ninth method step 109 and the communication link between the control unit 2 and the field device 1 is disconnected.

The invention claimed is:

1. A method for initializing a communication link between a field device and a control unit according to a communication protocol wherein the communication protocol defines a broadcasting message with a data area, the method comprising:

generating and transmitting a broadcasting message by the field device according to the communication protocol with a first datum in the data area, wherein the first datum determines whether a communication link is possible or not, and wherein the first datum is set by the field device as a control parameter representing an operational readiness state of the field device for communication link initialization, independent of a measurement of signal strength or distance;

receiving the broadcasting message by the control unit; and then, when the first datum determines the possibility of the communication link, initializing the communication link by the control unit based on the operational readiness state indicated by the first datum.

2. The method according to claim 1, wherein the first datum is displayed by the control unit for a user of the control unit.

3. The method according to claim 1, wherein a duration until the communication link is possible is determined by the field device as the first datum; and wherein the communication link is initialized by the control unit after the duration has elapsed.

4. The method according to claim 1, wherein the first datum determines the possibility of the communication link and a second datum is generated by the field unit in the data area and the second datum determines a duration until the possibility of the communication link; and wherein the communication link is initialized by the control unit after the duration has expired.

5. The method according to claim 3, wherein the duration is displayed by the control unit for a user of the control unit.

6. The method according to claim 1, wherein the communication link is established by the control unit and the field device after the initialization of the communication link and is communicated according to the communication protocol.

7. The method according to claim 3, wherein an attempt to establish the communication link is unsuccessful and wherein the field device increases the duration by an amount.

8. The method according to claim 7, wherein the duration is increased by the amount or by another amount for each unsuccessful attempt to establish the communication link in a time interval.

9. The method according to claim 1, wherein the field device and the control unit communicate with each other via radio over the communication link according to the communication protocol.

10. The method according to claim 9, wherein the communication protocol is a Bluetooth standard.

11. The method according to claim 10, wherein the broadcasting message is an advertising message.

12. The method according to claim 4, wherein the first datum is stored in a bit of a byte in the broadcasting message; and wherein the second datum is stored in at least one of the remaining bits of the byte.

13. The method according to claim 1, wherein an unauthorized authentication is attempted by the control unit at the field device; and wherein the authentication is rejected by the field device and an existing communication link between the control unit and the field device is disconnected.

14. The method according to claim 13, wherein the authentication is performed to extend rights on the field device or in connection with the communication link.

15. The method according to claim 13, wherein the authentication is performed with a PIN or a password.

16. The method according to claim 1, wherein the operating unit is a smartphone.

17. The method according to claim 1, wherein the field device is a flowmeter, or a level measuring device, or a level switch, or a temperature measuring device or a pressure measuring device.

18. A method for initializing a communication link between a field device and a control unit according to a communication protocol wherein the communication protocol defines a broadcasting message with a data area, the method comprising:

generating and transmitting a broadcasting message by the field device according to the communication protocol with a first datum in the data area and wherein the first datum determines whether a communication link is possible or not;

receiving the broadcasting message by the control unit; and then, when the first datum determines the possibility of the communication link, initializing the communication link by the control unit, wherein a duration until the communication link is possible is determined by the field device as the first datum;

wherein the communication link is initialized by the control unit after the duration has elapsed; and wherein the field device reduces the duration by a waiting time and, after the waiting time has elapsed, the broadcasting message is transmitted again with the reduced duration.

19. The method according to claim 18, wherein the field device resends the broadcasting message several times and the duration is reduced by the waiting time in each case.

20. A method for initializing a communication link between a field device and a control unit according to a communication protocol wherein the communication protocol defines a broadcasting message with a data area, the method comprising:

generating and transmitting a broadcasting message by the field device according to the communication protocol with a first datum in the data area and wherein the first datum determines whether a communication link is possible or not;

receiving the broadcasting message by the control unit; and then, when the first datum determines the possibility of the communication link, initializing the communication link by the control unit, wherein the first datum is stored in a bit of a byte in the broadcasting message.

* * * * *